US006926974B2

(12) United States Patent
Kawato et al.

(10) Patent No.: US 6,926,974 B2
(45) Date of Patent: *Aug. 9, 2005

(54) PERPENDICULAR MAGNETIC RECORDING MEDIUM AND MAGNETIC STORAGE APPARATUS

(75) Inventors: Yoshiaki Kawato, Tokyo (JP); Masaaki Futamoto, Shiroyama (JP); Kazuhiro Nakamoto, Tokyo (JP)

(73) Assignee: Hitachi Global Storage Technologies Japan, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/861,568

(22) Filed: May 22, 2001

(65) Prior Publication Data

US 2002/0028356 A1 Mar. 7, 2002

(30) Foreign Application Priority Data

May 23, 2000 (JP) ........................................ 2000-151279

(51) Int. Cl.[7] .............................. G11B 5/66; G11B 5/70
(52) U.S. Cl. ........................... 428/694 TM; 428/694 TS
(58) Field of Search ..................... 428/694 TM, 694 TS, 428/900, 611, 667, 668

(56) References Cited

U.S. PATENT DOCUMENTS

| | | | |
|---|---|---|---|
| 4,687,712 A | 8/1987 | Sugita et al. | ............... 428/611 |
| 5,226,966 A | 7/1993 | Mallary et al. | ............. 118/623 |
| 5,589,262 A | 12/1996 | Kiuchi et al. | ............... 428/336 |
| 5,851,643 A * | 12/1998 | Honda et al. | ............... 428/212 |
| 6,280,813 B1 * | 8/2001 | Carey et al. | ............... 428/65.3 |
| 6,383,668 B1 * | 5/2002 | Fullerton et al. | ..... 428/694 TM |
| 6,686,070 B1 * | 2/2004 | Honda et al. | .......... 428/694 TS |
| 6,740,383 B2 * | 5/2004 | Shinohara et al. | ......... 428/65.3 |
| 2002/0028357 A1 * | 3/2002 | Shukh et al. | ........ 428/694 TM |
| 2002/0127433 A1 * | 9/2002 | Shimizu et al. | ...... 428/694 TM |

FOREIGN PATENT DOCUMENTS

| | | |
|---|---|---|
| JP | 60-140525 | 12/1983 |
| JP | 1-227216 | 3/1988 |
| JP | 6-103550 | 9/1992 |
| JP | 7-85442 | 9/1993 |
| JP | 10-228620 | 2/1997 |
| JP | 2001-155321 | 11/1999 |

OTHER PUBLICATIONS

Toshikazu Nishihara et al., "High SN Ratio and Signal–Stability in Triple Layer Perpendicular Media", Central R&D Center, JVC, with English abstract, pp. 104–108.
J. R. Desserre, "Crucial Points in Perpendicular Recording", IEEE Transactions on Magnetics, vol. MAG– 20, No. 5, (Sep. 1984), pp. 663–668.
Shun–ichi Iwasaki, "Perpendicular Magnetic Recording—Evolution and Future", IEEE Transactions on Magnetics, vol. MAG–20, No. 5, (Sep. 1984), pp. 657–662.
Toshikazu Nishihara and Toshio Ando, "High SN Ratio And Signal–Stability In Triple Layer Perpendicular Media", Central R&D Center, JVC, pp. 104–108.
Iwasaki, "Perpendicular Magnetic Recording—Evolution and Future," IEEE Transactions on Magnetics, vol. Mag–20, No. 5, Sep. 1984, pp. 657–662.
Desserre, "Crucial Points in Perpendicular Recording," IEEE Transactions on Magnetics, vol. Mag–20, No. 5, Sep. 1984, pp. 663–668.

* cited by examiner

*Primary Examiner*—Holly Rickman
(74) *Attorney, Agent, or Firm*—Reed Smith LLP; Stanley P. Fisher, Esq.; Juan Carlos A. Marquez, Esq.

(57) ABSTRACT

An improved perpendicular magnetic recording medium and an improved magnetic storage apparatus are provided, which are suitable for high speed and high density magnetic recording. A magnetic under layer of a two-layered perpendicular magnetic recording medium includes three layers: a ferromagnetic layer; a non-magnetic layer; and a ferromagnetic layer, wherein the ferromagnetic layers are antiferromagnetically coupled with each other, thereby preventing a magnetic flux from a magnetic wall in a magnetic under layer from entering a read back head.

12 Claims, 8 Drawing Sheets

Mr/Ms=0.89
Hs   =0.06 kOe (b)

Mr/Ms=0.0
Hs   =2.2 kOe

Thickness of Ru layer (nm)

Prior Art

embodiment

PERPENDICULAR MAGNETIC RECORDING MEDIUM AND MAGNETIC STORAGE APPARATUS

BACKGROUND OF THE INVENTION

1. Field of the Invention

The present invention relates to a perpendicular magnetic recording medium suitable for high density magnetic recording, and a magnetic storage apparatus using the same.

2. Description of the Related Art

Along with the rapid propagation of personal computers, work stations, and the like, there has been a growing demand for increasing the capacity of a magnetic disk apparatus, which is the core of a non-volatile file system. In order to increase the capacity of a magnetic disk apparatus, it is necessary to increase the recording bit density, i.e., the plane recording density. A recording system employed for currently-used magnetic disk apparatuses is called "in-plane recording system". In this system, a ferromagnetic layer having a large coercivity in a direction parallel to the disk substrate plane is used as a recording medium, and information is recorded by magnetizing the recording medium in a direction in the substrate plane. In such a case, bit "1" corresponds to a magnetic inversion section where two adjacent portions are oppositely magnetized to each other, i.e., at an angle of 180°. In order to increase the in-plane recording density, it is necessary to increase both the bit density in the circumferential direction of the disk (linear recording density) and the bit density in the radial direction (track density). While the track density is limited by the track width formation process or the positioning precision of the read/recording head, they are primarily only technical problems. It is believed that the linear recording density, on the other hand, is subject to a limitation in principle due to the characteristics of the recording medium.

In an in-plane recording system, two oppositely-magnetized portions exist facing each other with a magnetic inversion point therebetween, thereby creating a large demagnetizing field. Due to the demagnetizing field, a transitional region of a finite width is formed in the magnetic inversion section. The width of the magnetic inversion region needs to be at least smaller than the bit interval. Accordingly, in order to increase the linear recording density, it is necessary that the medium is magnetized despite the demagnetizing field. More specifically, it is necessary to reduce the thickness of the recording magnetic layer while improving the coercivity of the medium. Thus, the linear recording density is greatly limited by the magnetic properties of the medium. In a standard in-plane magnetic recording system, it is desirable that the ratio of the linear recording density with respect to the track density is about 10. In order to realize a recording density of 50 Gb/in$^2$ under such a condition, the bit interval in the circumferential direction is about 25 nm. A magnetic properties estimation with a simple model shows that a medium in which the width of the magnetic inversion region is 25 nm or less needs to have a thickness of 15 nm or less and a coercivity of 5 kOe or more.

However, with a coercivity over 5 kOe, it is difficult to ensure a recording magnetic field with which the medium can be sufficiently magnetized. Moreover, with a Co-alloy-based magnetic layer, when the thickness of the magnetic layer is 15 nm or less, the substantial volume of the medium crystal grain is so small that the magnitude of the thermal energy of the grain is non-negligible with respect to the magnetic anisotropy energy thereof. As a result, the influence of the thermal fluctuation becomes significant, thereby posing a problem of thermal decay, where the magnitude of the recording magnetization decreases over time. When one attempts to ensure the crystal grain volume with the crystal size in the in-plane direction, there will be an increase in the medium noise, whereby a sufficient S/N ratio cannot be obtained. Thus, difficulties in principle are expected in realizing an in-plane recording density of 50 Gb/in$^2$ or more while achieving a sufficient thermal decay resistance and low noise.

A perpendicular magnetic recording system is a system in which a thin-film medium is magnetized in a direction perpendicular to the film plane thereof. It is believed that a perpendicular magnetic recording medium is different from an in-plane magnetic recording medium in the prior art in terms of the recording principle and the mechanism in which medium noise occurs. In the perpendicular magnetic recording system, adjacent magnetized portions are not facing each other but are in an antiparallel arrangement, whereby there is no influence of a demagnetizing field. Therefore, it would be expected that a magnetic inversion can be achieved within a very narrow region, and it is easier to increase the linear recording density. Moreover, since the demand for reducing the thickness of the medium is not as strong as that for an in-plane recording medium, it is possible to ensure a high resistance to the thermal decay. Thus, the perpendicular magnetic recording system has been attracting public attention as a system that is essentially suitable for high density magnetic recording, and various medium materials and structures have been proposed therefor. Various perpendicular magnetic recording systems include those in which a single perpendicular magnetic layer is used and those in which a magnetic under layer is provided on a perpendicular magnetic layer. A technique using a two-layered perpendicular magnetic recording medium having a magnetic under layer is described in, for example, IEEE Transaction on Magnetics, Vol.MAG-20, No.5, September 1984, pp.657–662, "Perpendicular Magnetic Recording-Evolution and Future". A medium in which a perpendicular magnetic layer made of a CoCr alloy is provided on an under layer made of a soft magnetic material such as a permalloy is a candidate for the perpendicular magnetic recording medium for this system.

In order to realize a magnetic storage apparatus capable of high density magnetic recording of 50 Gb/in$^2$ or more based on a perpendicular magnetic recording system using a two-layered perpendicular magnetic recording medium, it is necessary to reduce the medium noise. The medium noise occurs from both the perpendicular magnetic layer and the magnetic under layer, and particularly the spike-shaped noise occurring from the magnetic under layer has been a problem. An example of such noise is described in, for example, IEEE Transaction on Magnetics, Vol.MAG-20, No.5, September 1984, pp.663–668, "Crucial Points in Perpendicular Recording". In order to address such a problem, a method for forming an in-plane magnetic layer under a magnetic under layer has been proposed in the art, as seen in Journal of the Magnetics Society of Japan, Vol.21, Supplement No.S1, pp.104–108 "Increasing S/N of Three-Layered Perpendicular Medium and Stability of Recorded Signal". However, it was not sufficient for realizing a magnetic storage apparatus capable of high density magnetic recording of 50 Gb/in$^2$ or more.

SUMMARY OF THE INVENTION

An object of the present invention is to provide a perpendicular magnetic recording medium having low noise characteristics for realizing a high recording density of 50 Gb/in² or more, thereby facilitating the realization of a high density magnetic storage apparatus.

In order to realize a perpendicular magnetic recording medium having low noise characteristics, the present invention provides a perpendicular magnetic recording medium including a non-magnetic substrate, a magnetic under layer, a perpendicular magnetic layer and a protective lubricant layer, the perpendicular magnetic layer and the protective lubricant layer being provided on the non-magnetic substrate via the magnetic under layer, wherein the magnetic under layer includes at least one set of a layered structure of ferromagnetic layer/non-magnetic layer/ferromagnetic layer, and the magnetizations of the ferromagnetic layers are coupled with each other in an antiparallel state. The noise due to the magnetic under layer can be reduced by preventing a leakage flux occurring from a magnetic wall in the magnetic under layer from entering the read back head while securing the magnetic wall present in the magnetic under layer so that it is not easily moved.

Specifically, the present invention provides a perpendicular magnetic recording medium, including a non-magnetic substrate, a magnetic under layer, and a perpendicular magnetic layer, the perpendicular magnetic layer being provided on the non-magnetic substrate via the magnetic under layer, wherein the magnetic under layer includes at least one non-magnetic layer sandwiched by adjacent ferromagnetic layers.

The non-magnetic layer of the magnetic under layer may be a non-magnetic metal layer made of a material selected from the group consisting of Ru, Rh, Ir, Cr and an alloy thereof, and each of the ferromagnetic layers adjacent to the non-magnetic layer of the magnetic under layer may be a magnetic layer made of a material selected from the group consisting of Co, Ni, Fe and an alloy thereof. Magnetizations of the two ferromagnetic layers adjacent to the non-magnetic layer of the magnetic under layer are coupled with each other in an antiparallel state.

The present invention also provides a magnetic storage apparatus, including a perpendicular magnetic recording medium, driving means for driving the perpendicular magnetic recording medium, a magnetic head including a write section and a read back section, means for relatively moving the magnetic head with respect to a magnetic recording medium, and signal processing means for inputting a signal to the magnetic head and reading back an output signal from the magnetic head, wherein the magnetic recording medium is the above-mentioned perpendicular magnetic recording medium.

According to the present invention, since the noise due to the magnetic under layer of the perpendicular magnetic recording medium is significantly reduced, the S/N ratio is significantly improved, and it is possible to realize a magnetic recording apparatus providing a high recording density.

The nature, principle, and utility of the invention will become more apparent from the following detailed description when read in conjunction with the accompanying drawings.

DETAILED DESCRIPTION OF THE PREFERRED EMBODIMENT

Embodiments of the present invention will now be described with reference to the drawings.

EXAMPLE 1

Figure 1:
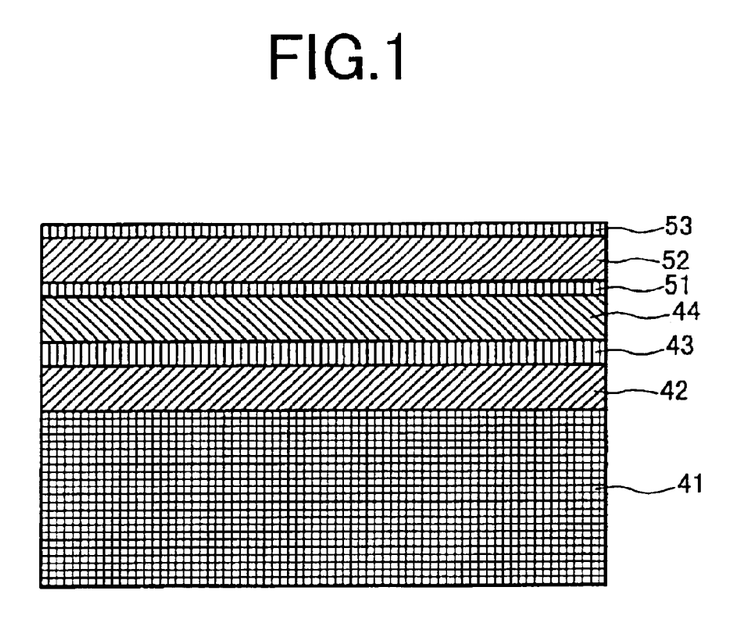
FIG. 1 is a schematic cross-sectional view illustrating a structure of an exemplary perpendicular magnetic recording medium according to the present invention.
Figure 2:
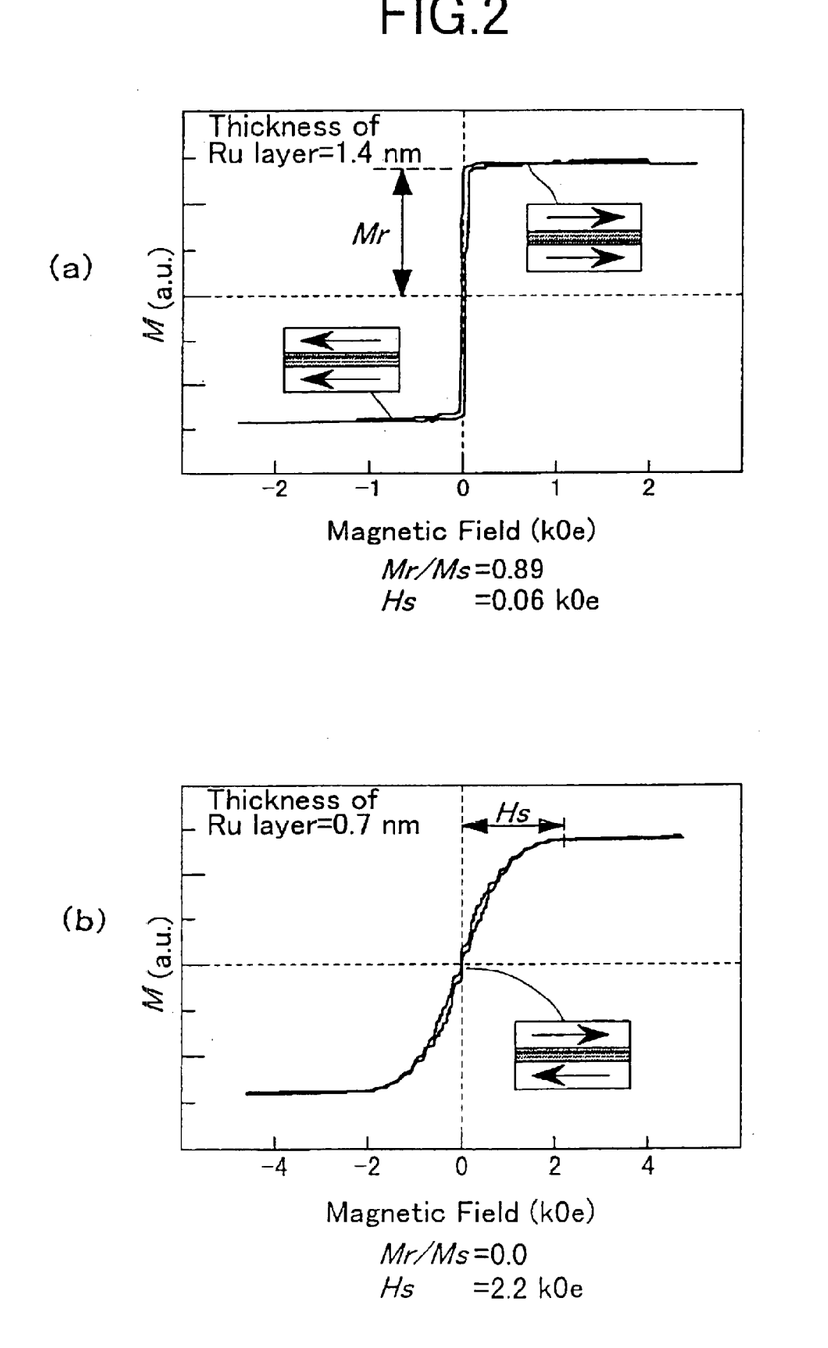
FIG. 2A and FIG. 2B illustrate exemplary magnetic properties of a magnetic under layer.
Figure 3:
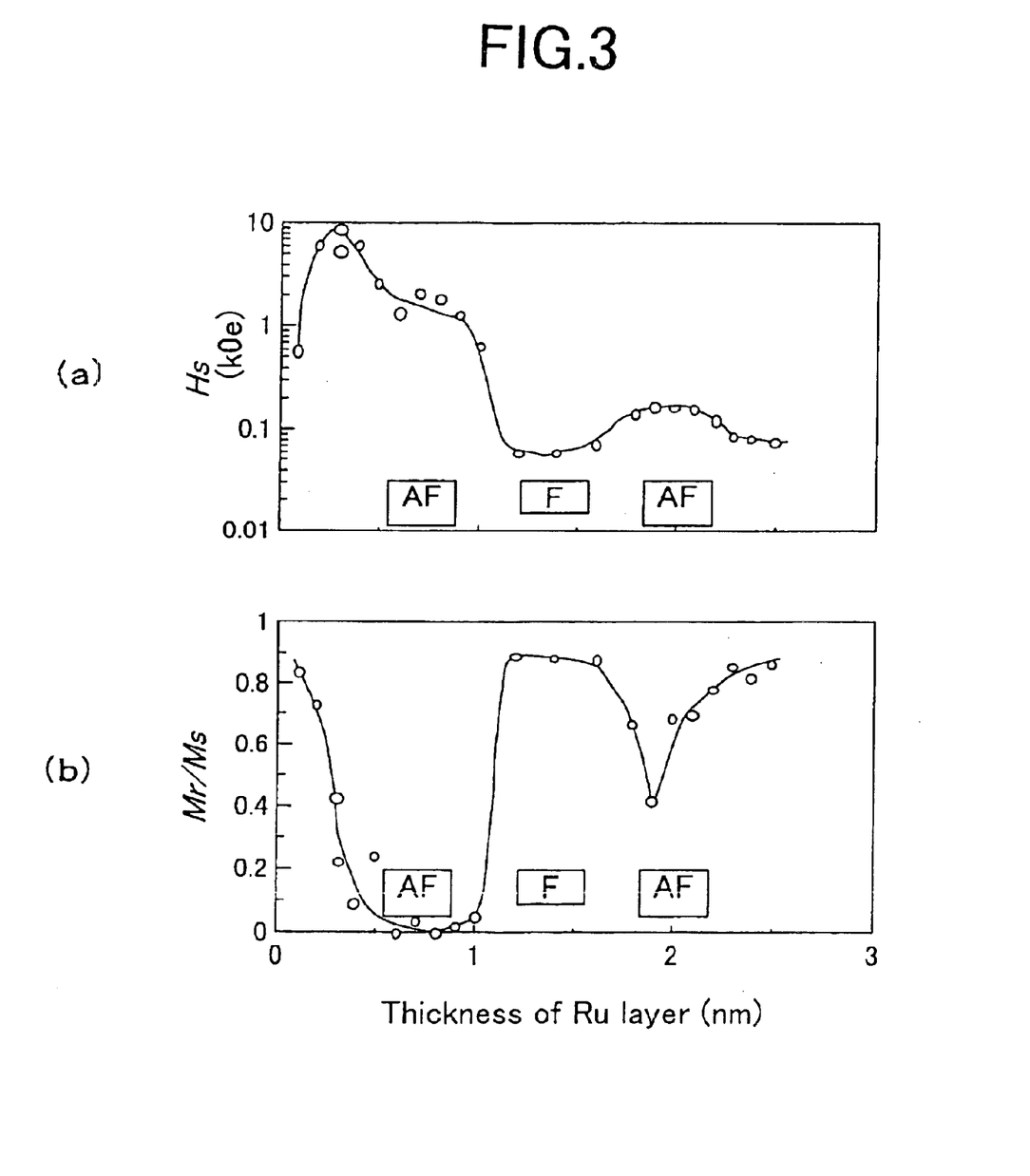
FIG. 3A and FIG. 3B illustrate an Ru layer thickness dependency of the magnetic properties of the magnetic under layer.

Using a glass substrate having a diameter of 2.5 inches, a magnetic recording medium having a cross-sectional structure as illustrated in FIG. 1 was produced by a DC magnetron sputtering method. A magnetic under layer including a first layer 42, a second layer 43 and a third layer 44 was formed on a substrate 41. A perpendicular magnetic layer (CoCrPt) 52 having a thickness of 25 nm and a protective layer 53 having a thickness of 5 nm were formed in this order on the magnetic under layer via an intermediate under layer (TiCr) 51 having a thickness of 5 nm. Two different media were produced, one in which the first layer 42 and the third layer 44 were both made of Co with a thickness of 30 nm, and the other in which the first layer 42 and the third layer 44 were both made of CoFe with a thickness of 30 nm. In both media, the second layer 43 was made of Ru.

FIG. 2A to FIG. 3B illustrate the results of measurements performed for the Ru layer thickness dependency of the magnetic properties of the three-layered magnetic under layer in order to optimize the thickness of the Ru layer. Note that the thickness of the Co layer was set to be 10 nm for the first layer 42 and the third layer 44. Substantially the same results were obtained when CoFe was used for the magnetic layers.

FIG. 2A and FIG. 2B illustrate magnetization curves for two different Co/Ru/Co three-layered magnetic under layers in which the thickness of the Ru layer was 1.4 nm and 0.7 nm, respectively. First, for the Ru layer having a thickness of 1.4 nm, it can be seen that the layer exhibits a behavior that is similar to that of a single ferromagnetic layer, thus indicating that the two Co layers are coupled together in a parallel state. On the other hand, for the Ru layer having a thickness of 0.7 nm, it can be seen that the magnetization M at magnetic field=0 is substantially zero, thus indicating that the two Co layers are coupled together in an antiparallel state, and a substantial coupling magnetic field of about 2.1 kOe has occurred from the magnetic field at which the magnetization is saturated. As described above, the Co/Ru/Co three-layered structure may be in either a parallel state or an antiparallel state depending upon the thickness of the Ru layer. In order to realize an intended magnetic under layer, the Co layers need to be coupled in an antiparallel state. In view of this, the magnetic properties were examined while varying the thickness of the Ru layer. The results are shown in FIG. 3A and FIG. 3B.

FIG. 3A illustrates the Ru layer thickness dependency of the magnetic field Hs at which the magnetization is saturated. It can be seen that the maximum point and the minimum point of Hs alternately appear as the thickness of the Ru layer is increased. On the other hand, in the Ru layer thickness dependency of the residual magnetization Mr illustrated in FIG. 3B, Mr takes the maximum value when Hs takes the minimum value, and vice versa. The former of the two regions of the thickness of the Ru layer corresponds to FIG. 2A, and the latter corresponds to FIG. 2B.

In view of the results shown above, the thickness of the Ru layer was set to be 0.7 nm, which is within the antiparallel coupling region, in this example. Since the thickness of each Co layer was 30 nm in this example, the antiparallel coupling magnetic field (equivalent to Hs) was about 500 Oe.

Figure 4:
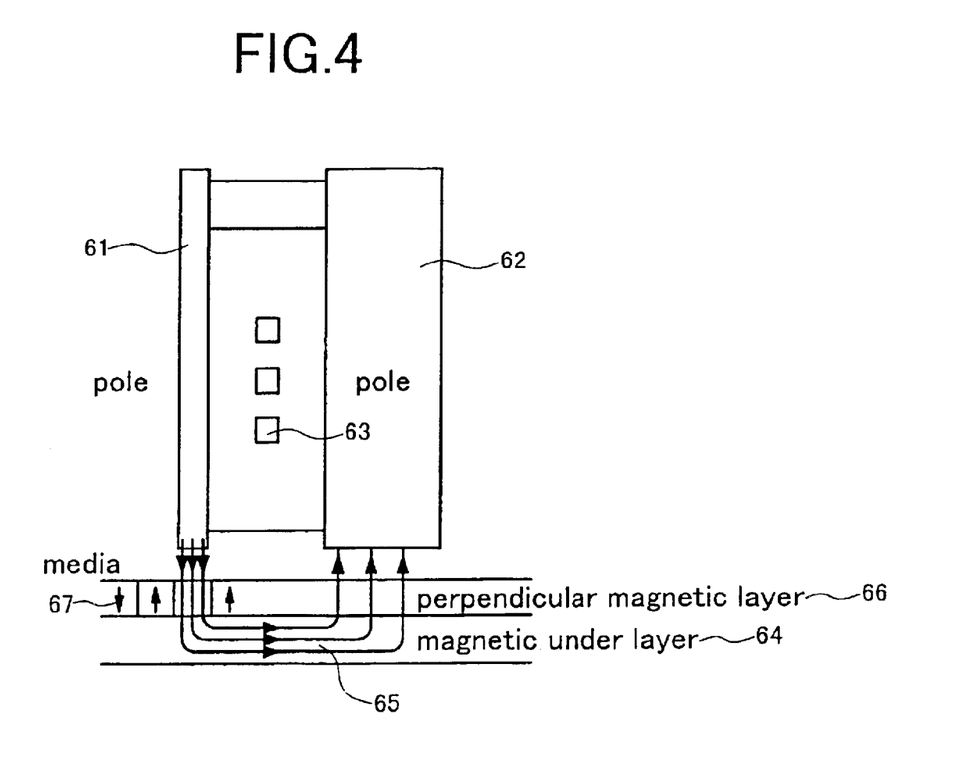
FIG. 4 is a schematic cross-sectional view illustrating a single pole type recording head and a magnetic recording medium.

In order to evaluate the characteristics of the recording media as described above, signals were recorded thereon by using a single pole type recording head. FIG. 4 is a schematic cross-sectional view illustrating the recording head and the recording medium used in the experiment. Note that the details of the medium are not shown in the figure. The recording head includes a main pole 61, a secondary pole 62 and an excitation coil 63. When a current is allowed to flow through the coil 63, the main pole 61 is excited, and a recording magnetic flux 65 from the tip of the main pole 61 passes through a magnetic under layer 64 into the secondary pole 62. The magnetic flux is confined to a small cross-sectional area at the tip of the main pole 61. As a result, a strong magnetic field is applied through a perpendicular magnetic layer 66, thereby producing a magnetization pattern 67 corresponding to the signal. In the experiment, two different signals of 60 kFCI and 600 kFCI were recorded. For the purpose of comparison, the same signals were recorded also on a conventional recording medium whose magnetic under layer is a single Co layer having a thickness of 60 nm. An observation of the surface of the media having signals recorded thereon with an MFM confirmed that sharp magnetic inversion had been recorded within a narrow track on both media.

Figure 5:
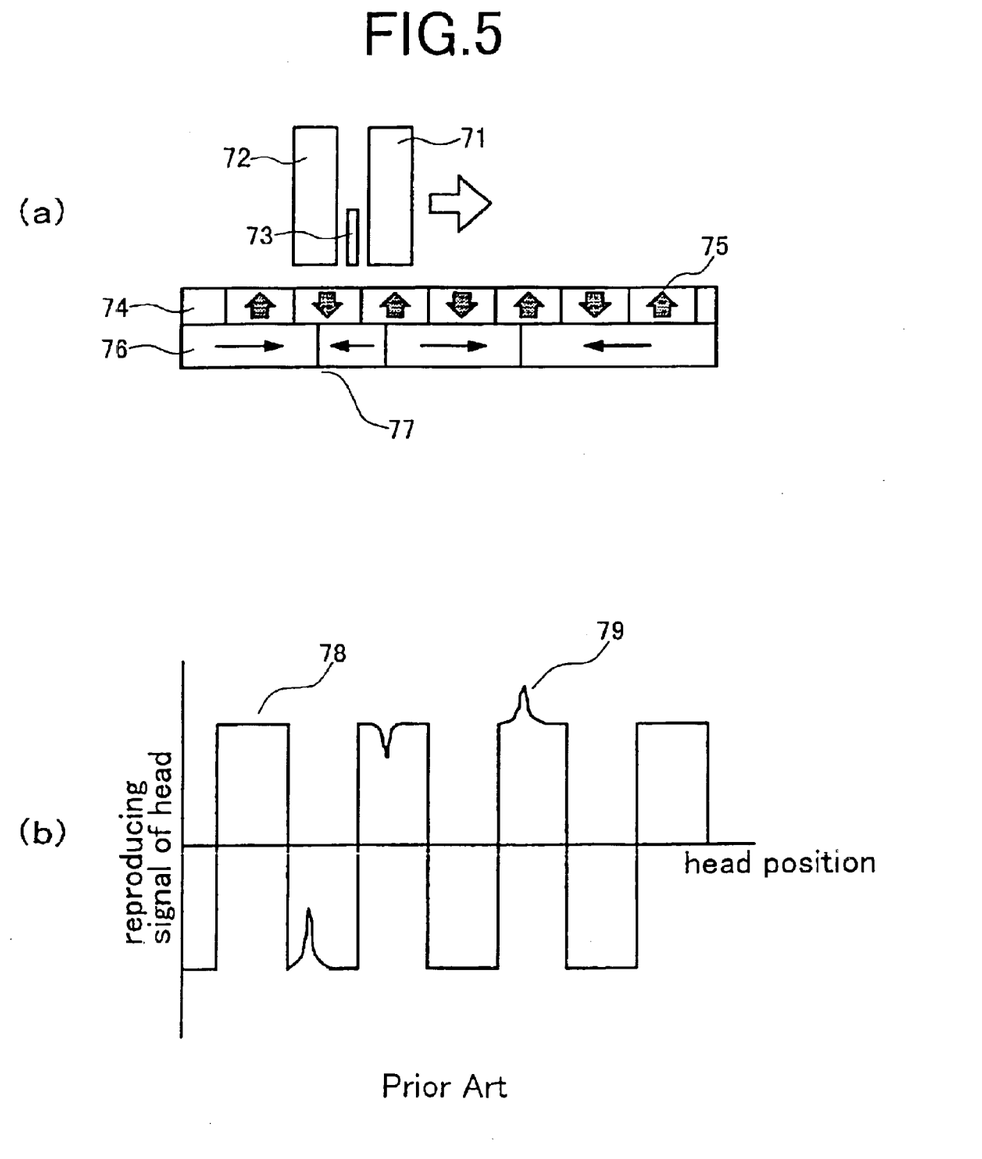
FIG. 5A is a cross-sectional view illustrating a read back head and a magnetic recording medium according to a conventional example.
FIG. 5B illustrates the waveform of a read signal.

Next, the recorded signals were read back with a read back head for comparison in the S/N ratio and the resolution. FIG. 5A is a cross-sectional view illustrating the read back head used in the experiment and the conventional recording medium having signals recorded thereon, and FIG. 5B illustrates an exemplary read signal. A shield type GMR head was used for the read back operation. The shield type GMR head includes a GMR element 73 being sandwiched between shields 71 and 72, which are arranged with an interval of 80 nm therebetween. The interval between the recording medium surface (the surface of a perpendicular magnetic layer 74) and the surface of the read back head is about 30 nm.

Generally, an ideal waveform of a read signal from a perpendicular recording medium having a magnetic under layer is rectangular. However, referring to FIG. 5B, a read signal waveform 78 includes spike-shaped noise 79 superimposed thereon. This is likely to be the result of multiple magnetic domains being formed in a magnetic under layer 76 irrespective of a recording pattern 75, as illustrated in FIG. 5A, whereby a static magnetic field is produced from a magnetic wall 77, to which the read back head responds.

Figure 6:
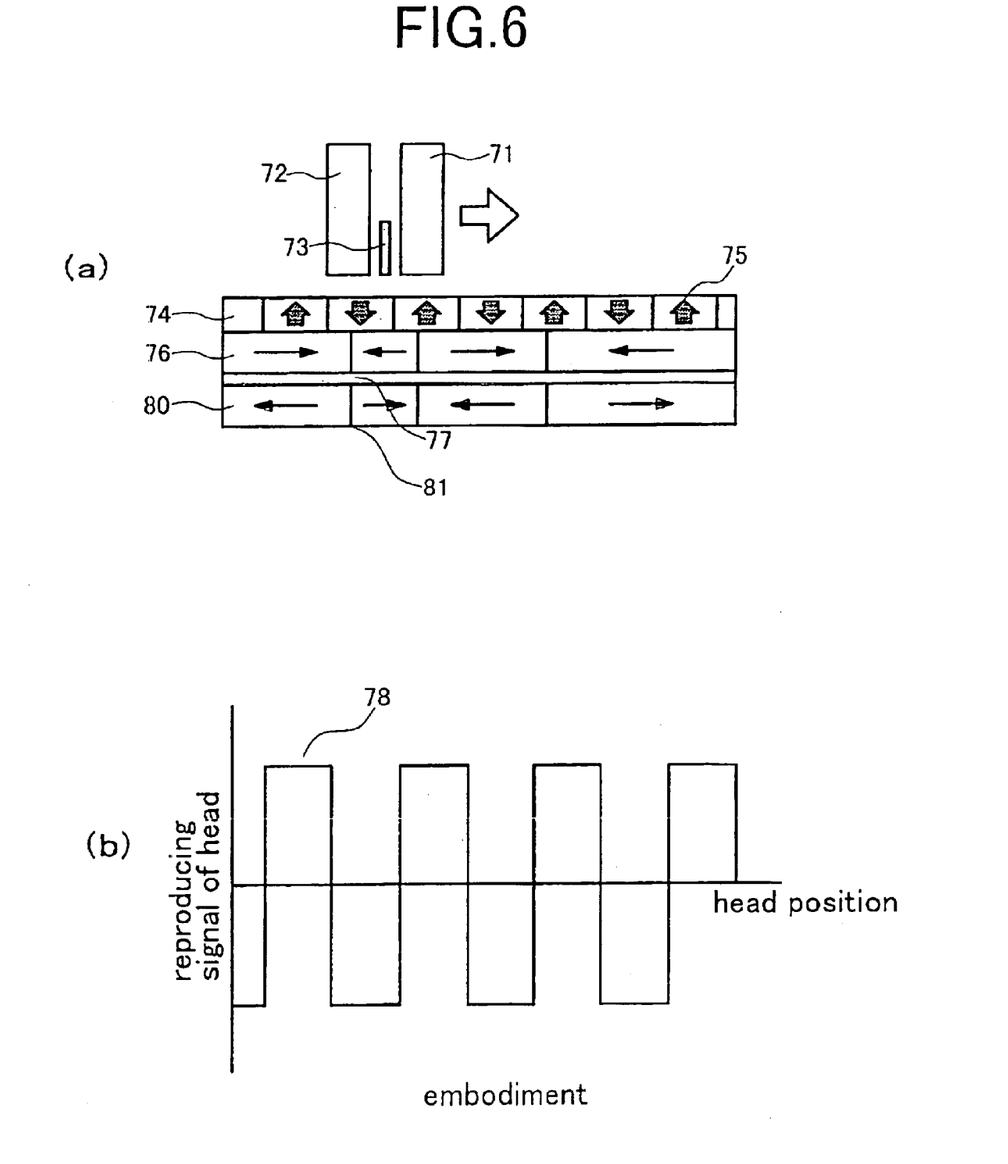
FIG. 6A is a cross-sectional view illustrating a read back head and a magnetic recording medium according to the present invention.
FIG. 6B illustrates an exemplary waveform of a read signal.

FIG. 6A and FIG. 6B illustrate exemplary evaluation results for the medium of the present invention. As can be seen from FIG. 6B, a read signal waveform 78 takes a generally ideal rectangular shape and does not include spike-shaped noise as in the convention example. This is likely to be the result of two Co layers 76 and 80 of the magnetic under layer being magnetically coupled in an antiparallel state, as illustrated in FIG. 6A, thus creating magnetic domains of opposite polarity in the upper and lower Co layers, respectively, whereby a static magnetic field from the magnetic wall 77 and that from a magnetic wall 81 are canceled out by each other. Thus, with the recording medium of the present invention, there can be expected an effect of reducing the noise from the magnetic under layer.

Next, the two media as described above were compared with each other in terms of the macroscopic characteristics of the signals. Table 1 below shows a comparison between the two media in terms of the S/N ratio and the resolution where a signal of 600 kFCI was magnetically recorded. The S/N ratio was evaluated as the ratio of the half value of the read output at a low recording density with respect to the noise at a high recording density (600 FCI). The resolution was measured as the proportion (percentage) of the read output for a signal recorded at 300 MHz (600 kFCI) with respect to the read output for a signal recorded at 30 MHz (60 kFCI).

TABLE 1

|  | Present invention | Prior art |
| --- | --- | --- |
| S/N (dB) | 25.5 | 24.3 |
| Resolution (%) | 12.2 | 9.6 |

It has been shown that the magnetic recording medium of this example provides an improved S/N ratio and thus is a desirable high density magnetic recording medium. It has also been shown that the magnetic recording medium of this example is suitable for high speed read/write operations since there is only little deterioration in read signals when the signals are recorded at a high frequency. The magnetic recording medium produced in this example was evaluated by using a GMR head as a read back element. As a result, it was possible to realize an on-track bit error rate of $10^{-8}$ at an in-plane recording density of 55 Gb/in$^2$, thereby confirming that the magnetic recording medium of this example had a sufficient performance to be used as a high density magnetic storage apparatus.

It has been shown that the magnetic recording medium of this example is a desirable high density magnetic recording medium with the S/N ratio and the high frequency write characteristics thereof which are significantly improved as compared with those of the comparative example. The magnetic recording medium produced in this example was evaluated by using, as a read back element, a high efficiency read back head based on the magnetic tunneling phenomenon. As a result, it was possible to realize an on-track bit error rate of $10^{-6}$ at an in-plane recording density of 80 Gb/in$^2$, thereby confirming that the magnetic recording medium of this example had a sufficient performance to be used as a super high density storage apparatus.

EXAMPLE 2

Figure 8:
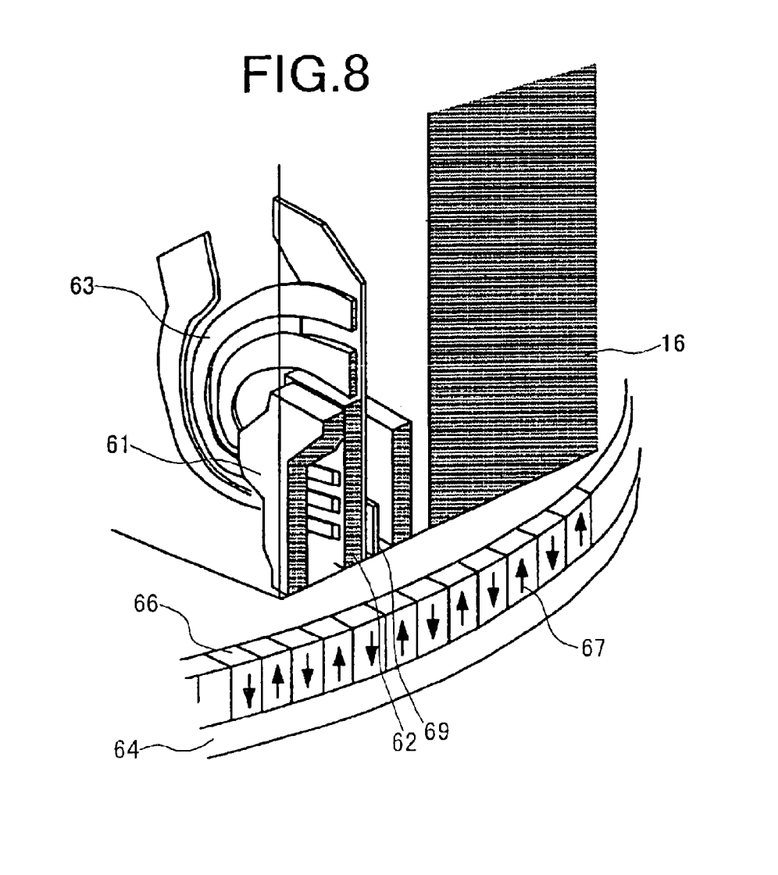
FIG. 8 is a schematic cross-sectional view illustrating a single pole type recording head, a GMR read back head and a magnetic recording medium.
Figure 9:
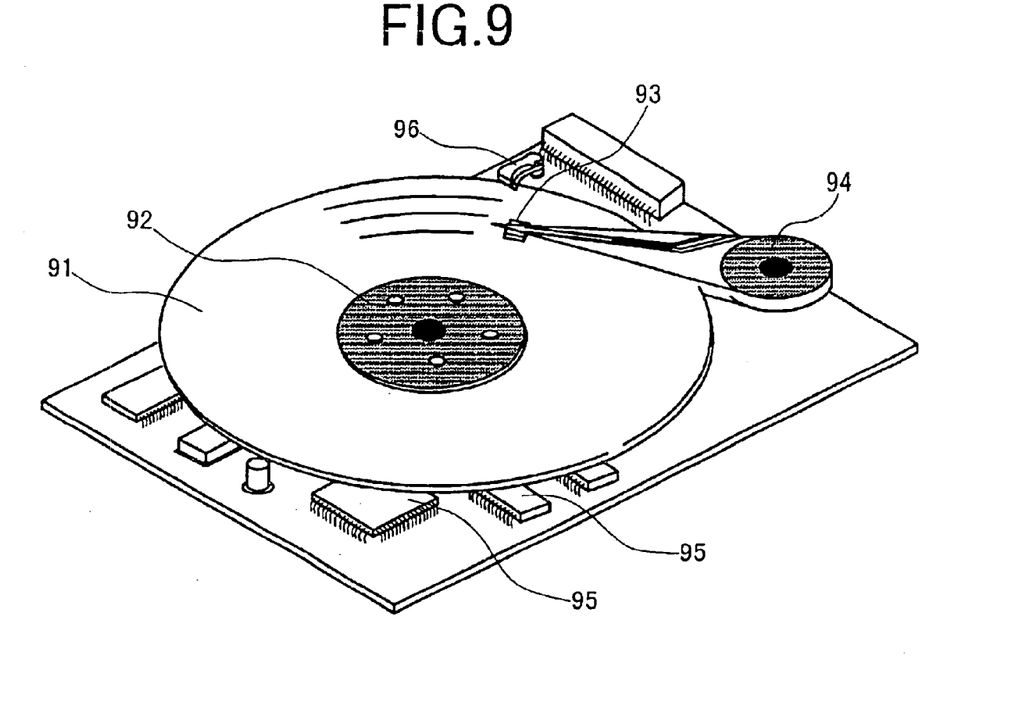
FIG. 9 is a schematic diagram illustrating a structure of a magnetic storage apparatus.

A magnetic storage apparatus as illustrated in FIG. 9 was produced by using a disk (FIG. 7) obtained by depositing the perpendicular magnetic recording medium of Example 1 on both sides of a substrate, and a read/recording head (FIG. 8) having a high efficiency read back element based on the giant magnetoresistive (GMR) effect.

The magnetic storage apparatus is of a well-known structure and includes a magnetic recording medium (disk) 91, a driving section 92 for rotating the magnetic recording medium 91, a magnetic head 93 having a magnetic write section and a read back section, a magnetic head driving section 94 for relatively moving the magnetic head 93 with respect to the magnetic recording medium 91, a signal processing section 95 for processing signals read/written by the magnetic head 93, and a load/unload mechanism 96.

Figure 7:
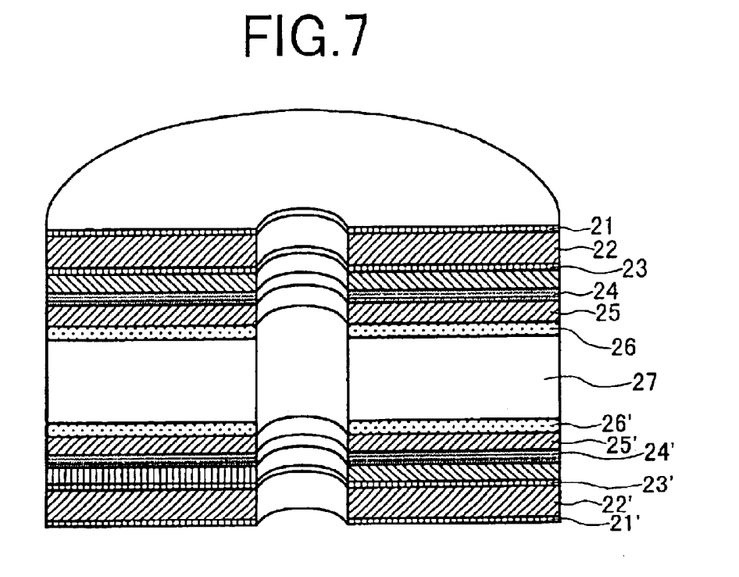
FIG. 7 is a schematic cross-sectional view illustrating an exemplary perpendicular magnetic recording medium according to the present invention.

FIG. 7 is a schematic cross-sectional view illustrating the disk. The disk includes a substrate 27 made of NiAl, a magnetic layer 26 (26') made of CoFe and having a thickness of 30 nm, a non-magnetic layer 25 (25') made of Ru and having a thickness of 0.7 nm, a magnetic layer 24 (24') made of CoFe and having a thickness of 30 nm, a non-magnetic intermediate layer 23 (23') made of TiCr and having a thickness of 3 nm, a perpendicular magnetic layer 22 (22') made of CoCrPt and having a thickness of 25 nm, and a protective layer 21 (21') made of carbon and having a thickness of 3.5 nm. The layers 26 to 21 (26' to 21') are deposited in this order on the substrate 27. The magnetic layer 26 (26'), the non-magnetic layer 25 (25') and the magnetic layer 24 (24') correspond to a magnetic under layer.

The main pole 61 of the recording head had a track width of 0.4 μm, a read back GMR head element 69 had a track width of 0.32 μm, and the spacing between the head and the medium 66 was 15 nm. The EEPR4 system was used as the signal processing system, and the apparatus was operated at an in-plane recording density of 55 Gb/in$^2$. As a result, an on-track bit error rate of $10^{-8}$ or less was obtained, and it was confirmed that the apparatus can operate as a high density storage apparatus having a capacity of 35 GB per disk.

EXAMPLE 3

Figure 10:
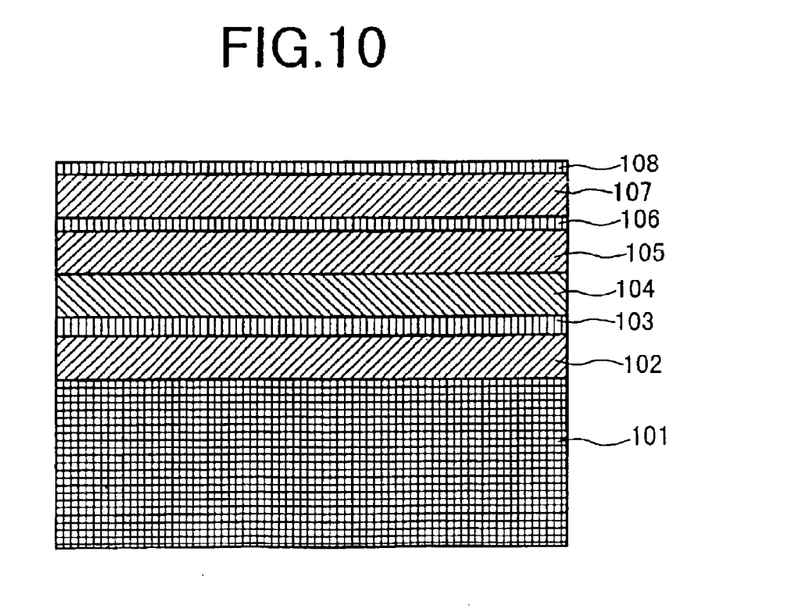
FIG. 10 is a schematic cross-sectional view illustrating another exemplary perpendicular magnetic recording medium according to the present invention.

Another evaluation was made while using a different perpendicular magnetic recording medium with the magnetic storage apparatus schematically illustrated in FIG. 9. FIG. 10 is a schematic cross-sectional view illustrating the perpendicular magnetic recording medium. The perpendicular magnetic recording medium includes a substrate 101 made of glass, a Co layer 102 having a thickness of 40 nm, an Ru layer 103 having a thickness of 0.7 nm, a Co layer 104 having a thickness of 40 nm, a Co-based amorphous ferromagnetic layer 105 having a thickness of 20 nm, a non-magnetic intermediate layer 106 having a thickness of 2 nm, a perpendicular magnetic layer 107 made of CoCrPtB and having a thickness of 30 nm, and a protective layer 108 made of carbon and having a thickness of 3 nm. The layers 102 to 108 are deposited in this order on the substrate 101.

In the perpendicular magnetic recording medium, the portion from the Co layer 102 to the Co-based amorphous ferromagnetic layer 105 functions as a magnetic under layer. The perpendicular magnetic recording medium is different from that of Example 1 in that a Co-based amorphous ferromagnetic layer is used as a portion of the under layer, thereby improving the crystallographic orientation of the perpendicular magnetic layer. In this example, a CoZrTa layer was used as the Co-based amorphous ferromagnetic layer. It was confirmed that the recording medium of this example had an S/N ratio of 26 dB and a resolution of 13%, indicating that the characteristics thereof are further improved from those of the recording medium shown in Table 1 above.

According to the present invention, it is possible to significantly improve the medium S/N ratio of a perpendicular magnetic recording medium, whereby it is possible to realize a magnetic disk apparatus capable of high speed and high density magnetic recording. Specifically, such a magnetic disk apparatus is capable of high density magnetic recording at a density over 50 Gb/in$^2$, thereby allowing for a reduction in the size of the apparatus and/or an increase in the capacity thereof, and thus facilitating the reduction in the cost therefor by reducing the number of disks.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A perpendicular magnetic recording medium, comprising a non-magnetic substrate, a magnetic under layer, and a perpendicular magnetic layer, the perpendicular magnetic layer being provided on the non-magnetic substrate via the magnetic under layer, wherein said magnetic under layer includes at least one non-magnetic layer sandwiched by adjacent ferromagnetic layers, and magnetization of the two ferromagnetic layers adjacent to the non-magnetic layer of said magnetic under layer are antiferromagnetically coupled with each other.

2. A perpendicular magnetic recording medium, comprising a non-magnetic substrate, a magnetic under layer, and a perpendicular magnetic layer, the perpendicular magnetic layer being provided on the non-magnetic substrate via the magnetic under layer wherein said magnetic under layer includes at least one non-magnetic layer sandwiched by adjacent ferromagnetic layers, the non-magnetic layer of said magnetic under layer is a non-magnetic metal layer made of a material selected from the group consisting of Ru, Rh, Ir, Cr and an alloy thereof, and each of the ferromagnetic layers adjacent to the non-magnetic layer of said magnetic under layer is a magnetic layer made of a material selected from the group consisting of Co, Ni, Fe and an alloy thereof, and magnetization of the two ferromagnetic layers adjacent to the non-magnetic layer of said magnetic under layer are antiferromagnetically coupled with each other.

3. A magnetic storage apparatus, comprising a perpendicular magnetic recording medium, driving means for driving said perpendicular magnetic recording medium, a magnetic head including a write section and a read back section, means for relatively moving said magnetic head with respect to said magnetic recording medium, and signal processing means for inputting a signal to said magnetic head and reading back an output signal from said magnetic head, wherein said magnetic recording medium is a perpendicular magnetic recording medium comprising a non-magnetic substrate, a magnetic under layer, and a perpendicular magnetic layer, the perpendicular magnetic layer being provided on the non-magnetic substrate via the magnetic under layer, wherein said magnetic under layer includes at least one non-magnetic layer sandwiched by adjacent ferromagnetic layers, and magnetizations of the two ferromagnetic layers adjacent to the non-magnetic layer of said magnetic under layer are antiferromagnetically coupled with each other.

4. The magnetic storage apparatus according to claim 3, wherein in said magnetic recording medium, the non-magnetic layer of said magnetic under layer is a non-magnetic metal layer made of a material selected from the group consisting of Ru, Rh, Ir, Cr and an alloy thereof, and each of the ferromagnetic layers adjacent to the non-magnetic layer of said magnetic under layer is a magnetic layer made of a material selected from the group consisting of Co, Ni, Fe and an alloy thereof.

5. The magnetic storage apparatus of claim 3, wherein a thickness of said at least one non-magnetic layer is in the range of 0.1 nm and 1 nm.

6. The magnetic storage apparatus of claim 4, wherein a thickness of said non-magnetic layer of said magnetic under layer is in the range of 0.1 nm and 1 nm.

7. The perpendicular magnetic recording medium of claim 1, wherein said non-magnetic layer includes Ru.

8. The perpendicular magnetic recording medium of claim 2, wherein said non-magnetic layer includes Ru.

9. The magnetic storage apparatus of claim 5, wherein said non-magnetic layer includes Ru.

10. The magnetic storage apparatus of claim 6, wherein said non-magnetic layer includes Ru.

11. The perpendicular magnetic recording medium of claim 1, wherein the ferromagnetic layers are antiferromagnetically coupled to each other via said non-magnetic layer having a thickness of 0.1 nm to 1.0 nm.

12. The perpendicular magnetic recording medium of claim 2, wherein the ferromagnetic layers are antiferromagnetically coupled to each other via said non-magnetic layer having a thickness of 0.1 nm to 1.0 nm.

* * * * *